June 28, 1932.                M. P. WETMORE                1,865,155
                           REFRIGERATING DEVICE
                           Filed March 12, 1928
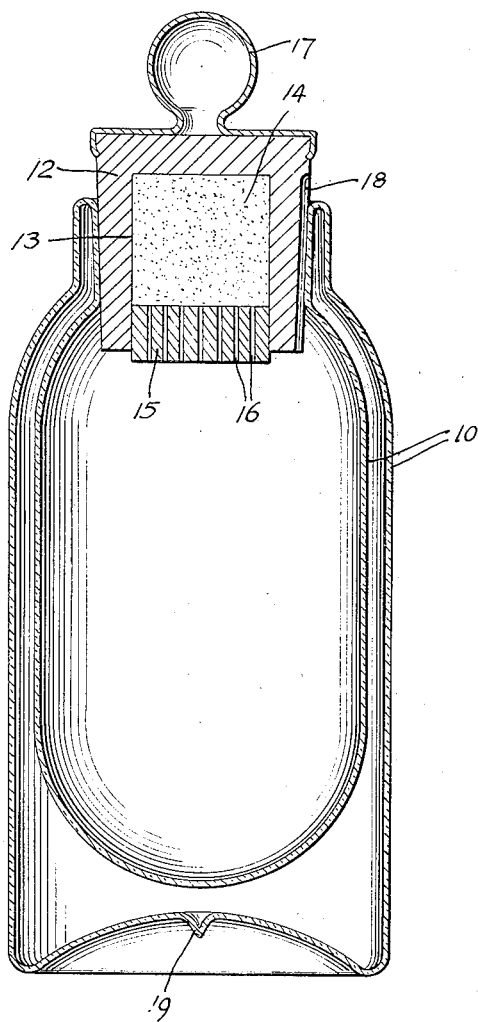
INVENTOR
MINER P. WETMORE
BY
Adolph A. Thomas ATTORNEY Patented June 28, 1932

1,865,155

UNITED STATES PATENT OFFICE

MINER P. WETMORE, OF NORWICH, CONNECTICUT, ASSIGNOR TO THE AMERICAN THERMOS BOTTLE COMPANY, OF NORWICH, CONNECTICUT, A CORPORATION OF OHIO

REFRIGERATING DEVICE

Application filed March 12, 1928. Serial No. 261,018.

My invention is for a self-contained cooling receptacle of novel construction adapted to keep the contents at low temperature. For this purpose I employ a suitable container, preferably a jar of the double-walled vacuum type, and a removable stopper having a chamber for holding a refrigerating medium, such as solidified carbon dioxid, commonly known in the market as dry ice. The cooling chamber or compartment in the stopper is closed with a pervious cover through which the carbon dioxid gas (or other gaseous refrigerant) escapes gradually into the receptacle, where it instantly expands with lowering of temperature. The receptacle may be used for storing and dispensing articles that must be kept cold, such as foodstuffs, liquids, and so forth.

In the basic aspect of my invention, the stopper that carries the cooling medium may be of any practical construction and design, depending largely on the size of the container. For small receptacles, the stopper may simply be a cork hollowed out to provide a chamber for the refrigerant. The mouth of this chamber is closed by a cover constructed to permit the escape of gas into the receptacle. This is probably one of the simplest forms of my invention, and is the one which I have selected for illustration in the drawing by way of example. The view there shown is a vertical cross-section of a double-walled vacuum bottle having a cork stopper with a cooling chamber.

A double-walled vacuum bottle 10 of suitable construction and design is provided with a stopper 12 adapted to fit in the neck of the bottle. The stopper 12 may be of any practical material impervious to gas, such as cork, rubber, metal, glass, and others suitable for the purpose. A chamber 13 in the stopper is adapted to hold a refrigerant 14, which is preferably solidified carbon dioxid or other cooling medium of similar character. In the present instance, we may assume that the stopper 12 is cork which has been hollowed out to form the chamber 13. If the stopper is made of a heat-conducting material, the cooling chamber 13 should preferably be lined for heat insulation.

The mouth of chamber 13 is closed by a cover 15 which is pervious to the escape of refrigerating gas. In the basic aspect of my invention, the cover 15 may be solid and provided with perforations 16 for the escape of gas, or it may be of porous material through which the gaseous refrigerant slowly escapes into the receptacle. In its simplest form, the cover 15 need only be a cork disk with small holes, as shown in the drawing. The stopper 12 may be provided with a knob 17 or other projection, both as an ornament and to facilitate handling of the stopper. A vent 18 allows the escape of accumulated gas into the air.

The operation of the refrigerating apparatus above described will be clearly understood, but I may summarize it in a few sentences. The heat-insulated receptacle 10 is adapted to hold substances that should be kept at low temperature, such as ice cream confections, certain kinds of candies, yeast cakes, liquids and so on. Solidified carbon dioxid (dry ice) or like refrigerant is packed into the chamber 14 which is then closed by disk 15. This so-called dry ice has a temperature of about 114.5 degrees Fahrenheit below zero. As carbon dioxid gas is formed by slow evaporation of the dry ice, the gas escapes through the pervious stopper 15 into receptacle 10, where it expands and lowers the surrounding temperature. The accumulated expanded gases in the receptacle pass into the atmosphere when the stopper 12 is removed for access to the contents. The vent 18 relieves excessive gaseous pressure in receptacle 10, in the event of the stopper 12 not being lifted in time to allow the escape of accumulated gas. The rate of evaporation of the solidified carbon dioxid depends on the temperature inside the vessel 10, and on the porosity or degree of perviousness of stopper 12. As the temperature in the jar rises, the evaporation of carbon dioxid gas increases. It is evident that by altering the combined area of holes 16 in stopper 15, the rate of evaporation of the gas is varied accordingly, so that it is possible to regulate the prevailing temperature in vessel 10 within certain practical limits. For example, ice cream confections should be kept at about 15° F. above zero to be in nice eatable condition. For yeast cakes, the temperature ought to be about 40° F. above zero.

The stopper 12 is heat-insulated or of heat-insulating material and therefore the outside temperature has no effect on the refrigerant 14. The only way for the gas to escape is through disk 15 into the receptacle 10, which also is heat-insulated. This combination provides a highly efficient refrigerating device, as I have actually demonstrated.

The double-walled vacuum bottle 10 may be of glass or sheet metal like brass, the latter being preferably plated with chromium, or like protective coating. If the bottle 10 is made of sheet metal, the projecting tip 19 through which the bottle is exhausted may be a tube of soft metal (like lead) soldered to the shell, so that the tube is easily softened and sealed at the end of the exhaust operation.

Although I have shown and described a certain specific construction, I want it understood that my invention is not limited to the details set forth. The underlying principle of my new refrigerating device may be mechanically carried out in various other ways without departing from the scope of the invention as defined in the appended claims.

I claim as my invention:

1. A heat-insulated receptacle having a hollow cork stopper adapted to hold a refrigerant in the form of solidified gas, and means permitting the gradual escape of gas from the stopper into the receptacle.

2. A heat-insulated receptacle having a removable stopper provided with a chamber for holding a refrigerant in the form of solidified gas, and a pervious closure for said chamber to permit the gradual escape of gas into the receptacle, said chamber forming a structural part of said stopper.

3. Refrigerating apparatus comprising a double-walled vacuum container having a stopper adapted to hold a refrigerant in the form of solidified carbon dioxid, and means on said stopper to allow the escape of gas into said container, said stopper and refrigerant being insertable into and removable from said container as a unit.

4. A refrigerating unit consisting of a stopper adapted to fit into a receptacle and having a chamber for holding a refrigerant in the form of solidified gas, the upper end of said chamber being permanently closed to the outer air and the lower end of said chamber having a closure pervious to the escape of gas.

5. A heat-insulated receptacle having a hollow cork stopper adapted to hold a refrigerant in the form of solidified gas, and a perforated cork disk fitted into the mouth of said hollow stopper to permit the escape of gas into the receptacle.

6. A refrigerating unit comprising a double-walled vacuum bottle consisting of a sheet metal shell plated with chromium and having a tubular projection of soft metal soldered thereto, said tubular projection serving to connect the annular space between the walls with a source of vacuum and being readily sealed by softening after the exhaust operation, and means carried by said bottle for holding dry ice and permitting it to escape as refrigerating gas into the bottle.

7. A refrigerating receptacle having a stopper adapted to hold dry ice which is permitted to escape as gas into the receptacle, the inner end of said stopper being open for the insertion of dry ice, and a movable closure for the inner end of said stopper.

8. A heat-insulated receptacle having a removable hollow stopper adapted to hold a gaseous refrigerant, the inner end of said hollow stopper being open for the insertion of the refrigerant, and means for closing said inner end of the filled stopper, said closing means permitting the escape of gas into the receptacle.

9. A heat-insulated receptacle having a removable cover provided with a chamber for holding a gaseous refrigerant, said chamber being closed to the outer air but pervious at its inner end to the escape of gas into the receptacle, and means permitting the filling of said chamber with the refrigerant, said chamber forming a structural part of said cover.

10. A refrigerating unit for receptacles comprising an impervious heat-insulated container adapted to be removably mounted on a receptacle, said container having a chamber for holding a refrigerant in the form of solidified gas, said chamber being closed to the outer air when the unit is mounted on the receptacle, and a pervious closure for the inner end of said container to allow the escape of gas downward into said receptacle, said closure being movable to open position to permit filling of the chamber with said refrigerant.

MINER P. WETMORE.